United States Patent [19]
Jones

[11] 3,781,032
[45] Dec. 25, 1973

[54] TRAILING ARM SUSPENSION SYSTEM

[76] Inventor: Vincent Jones, 343 W. 3rd St., Tooele, Utah 84074

[22] Filed: Apr. 24, 1972

[21] Appl. No.: 246,849

[52] U.S. Cl. ............................ 280/124 A, 267/20 A
[51] Int. Cl. ............................................. B60g 11/16
[58] Field of Search ................ 280/124 A; 267/20 A

[56] References Cited
UNITED STATES PATENTS

| | | | |
|---|---|---|---|
| 2,096,118 | 10/1937 | Leighton | 267/20 A |
| 2,556,767 | 6/1951 | McCann | 280/124 A |
| 2,760,787 | 8/1956 | Muller | 280/124 A |
| 3,201,142 | 8/1965 | Dangauthier | 280/124 A |

*Primary Examiner*—Philip Goodman
*Attorney*—Harvey B. Jacobson

[57] ABSTRACT

A generally Y-shaped vehicle suspension support arm with the free ends of the arms of the Y including structure for oscillatable support from a vehicle chassis portion about aligned horizontal transverse axes extending between the free ends of the Y arms. The free end of the base leg of the Y-shaped suspension arm curves laterally in the plane containing the arms of the Y and includes structure on its terminal end for oscillatably supporting a wheel spindle therefrom.

10 Claims, 6 Drawing Figures

PATENTED DEC 25 1973

TRAILING ARM SUSPENSION SYSTEM

The vehicle wheel suspension arm of the instant invention has been designed to provide an inexpensive and mechanically simple means of supporting one wheel of a vehicle from the chassis of the vehicle.

Although the suspension arm assembly of the instant invention has been specifically illustrated in the accompanying drawings and described in detail hereinafter as being a support for a front dirigible wheel of the associated vehicle, the suspension arm assembly may also be utilized for supporting a rear driving wheel. Also, the suspension arm assembly is disclosed in conjunction with an independent wheel suspension assembly. However, it will further be noted that a corresponding pair of opposite side suspension arm assemblies could be utilized to support the remote ends of a transverse axle member.

The main object of this invention is to provide a simplified means of supporting a wheel assembly from an associated vehicle chassis in a manner such that road shock may be substantially completely absorbed by the accompanying springing means and not transmitted, in any magnitude, to the vehicle chassis.

Another object of this invention, in accordance with the immediately preceding object, is to provide a vehicle wheel suspension system which, other than the trailing arm itself, will enable the use of conventional suspension components.

Yet another important object of this invention is to provide a trailing arm suspension system in accordance with the preceding objects and constucted in a manner whereby replacement of the trailing arm component thereof may be readily accomplished if and when desired.

A further object of this invention is to provide a trailing arm suspension system that may be readily utilized in conjunction with a kingpin and bushing supported wheel spindle or a ball joint supported spindle.

Yet another object of this invention is to provide a trailing arm suspension system that may be readily adapted for use either with independent wheel suspension or wheel suspension by means of a transverse axle member.

A final object of this invention to be specifically enumerated herein is to provide a trailing arm suspension system which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughouj.

Figure 1:
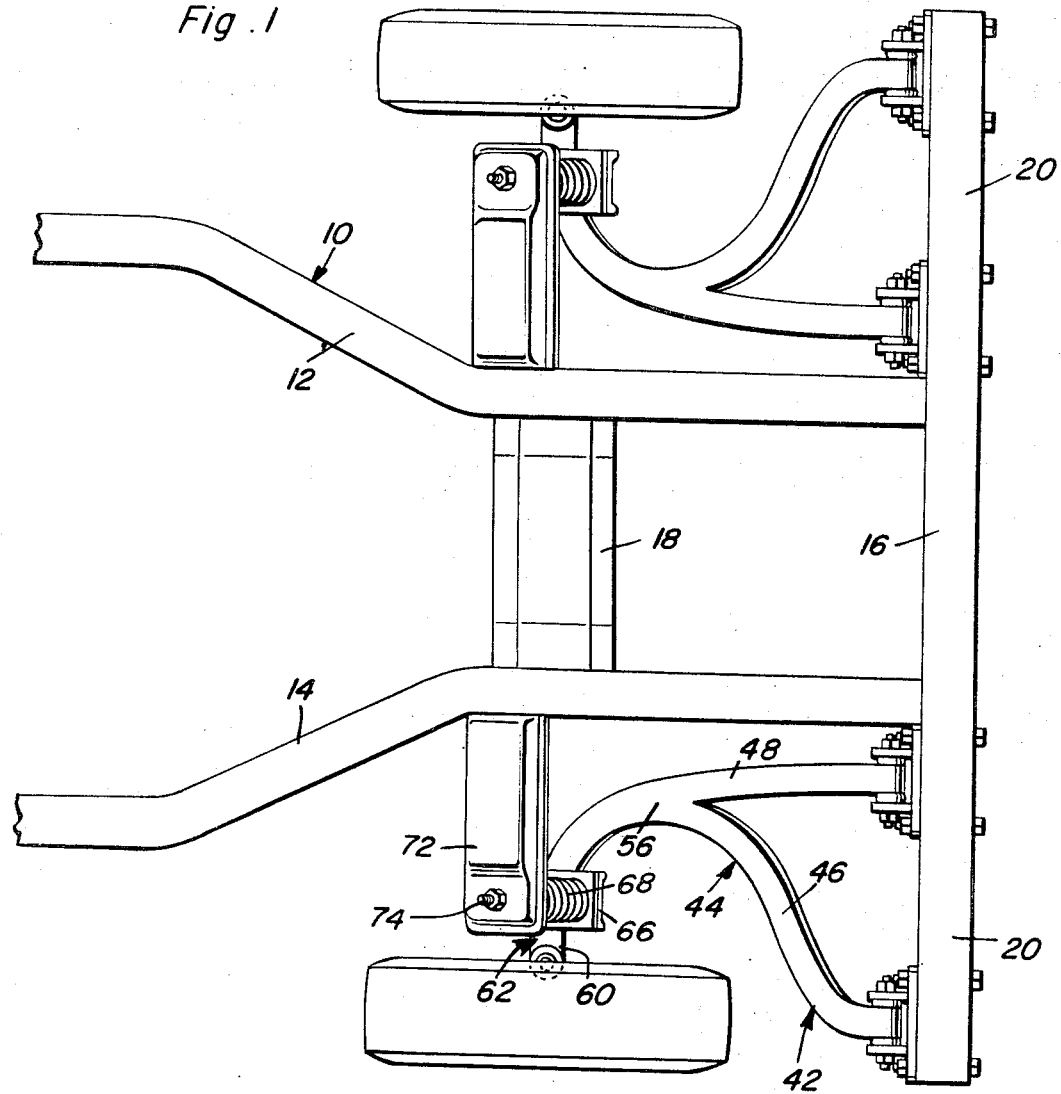
FIG. 1 is a fragmentary top plan view of a vehicle chassis with the trailing arm suspension system of the instant invention being utilized to support the front dirigible wheels of the vehicle chassis.
Figure 5:
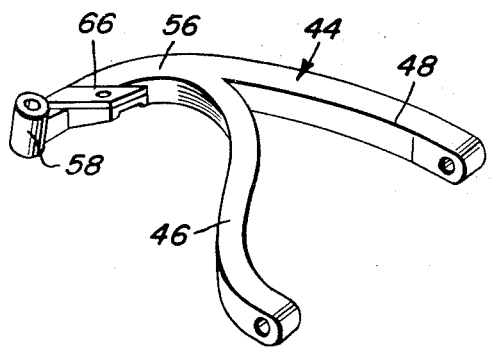
FIG. 5 is a perspective view of one of the Y-shaped support arms of the suspension system.
Figure 6:
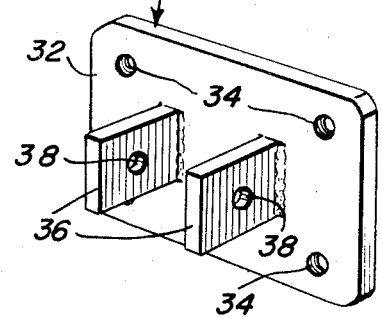
FIG. 6 is a perspective view of one of the mounting brackets which are used in pairs to oscillatably support each support arm from an associated vehicle chassis component.
Figure 2:
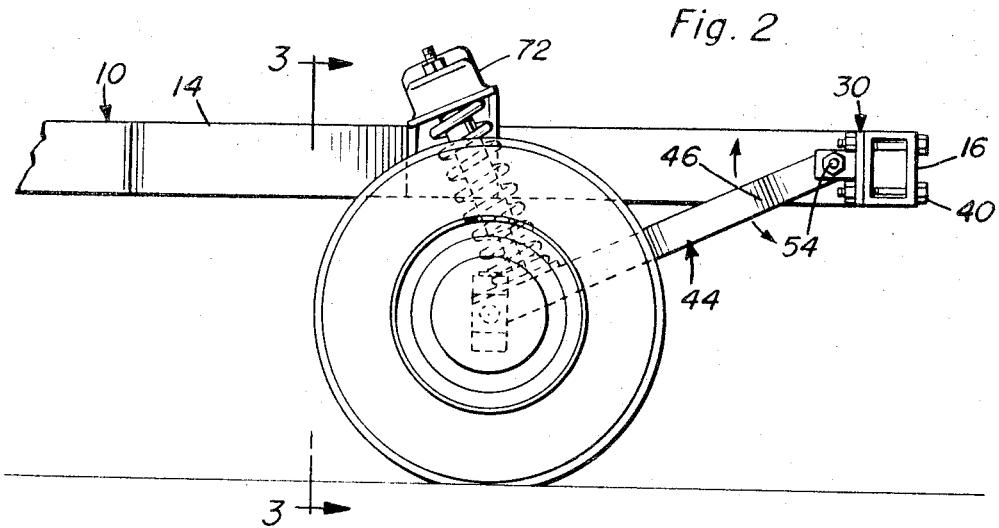
FIG. 2 is a side elevational view of the assemblage illustrated in FIG. 1.
Figure 3:
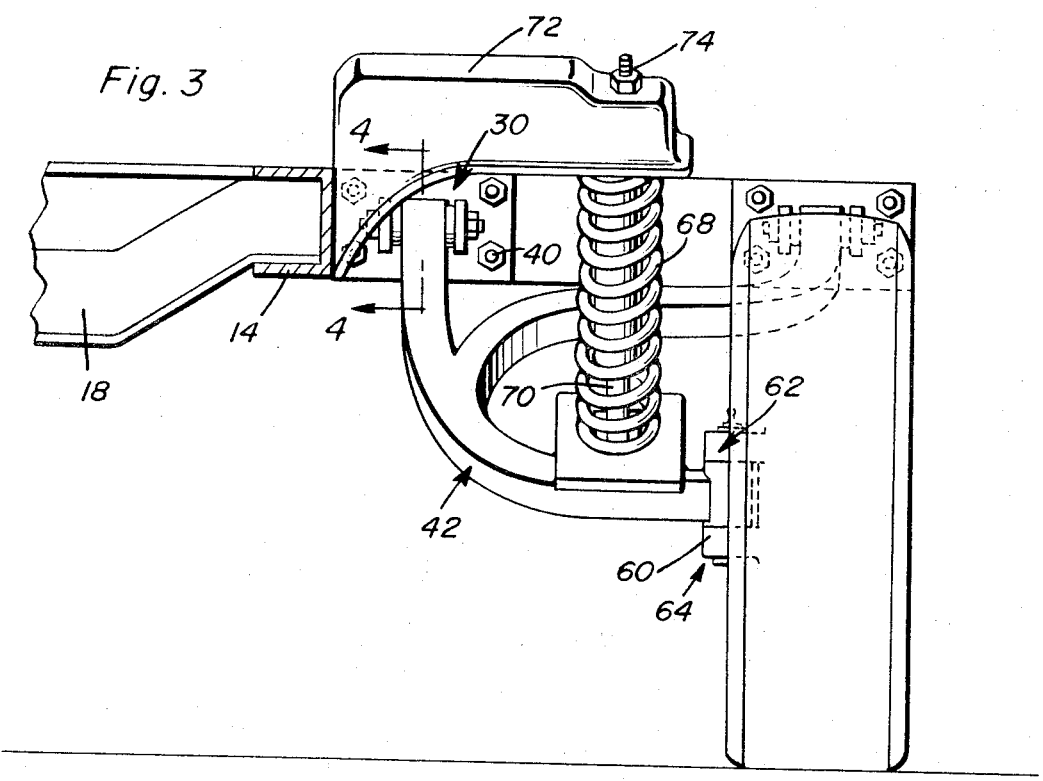
FIG. 3 is an enlarged transverse vertical sectional view taken substantially upon the plane indicated by the section line 3—3 of FIG. 2.
Figure 4:
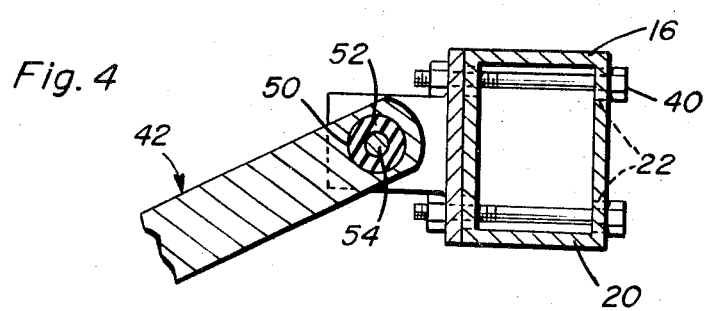
FIG. 4 is a fragmentary enlarged longitudinal vertical sectional view taken substantially upon the plane indicated by the section line 4—4 of FIG. 3.

Referring now more specifically to the drawings the numeral 10 generally designates a vehicle chassis including a pair of opposite side longitudinal members 12 and 14. The forward ends of the longitudinal members 12 and 14 are interconnected by means of a forward transverse member 16 and a second transverse member 18 is secured between the longitudinal members 12 and 14 rearward of the transverse member 16.

The opposite ends of the forward transverse member 16 project beyond and outwardly of the corresponding longitudinal frame members 12 and 14 as at 20 and each extended end 20 is provided with longitudinally spaced sets of transversely and vertically spaced aligned front and rear slots 22 and 24. The front transverse member 16 is tubular and includes front and rear walls 26 and 28 in which the slots 22 and 24, respectively, are formed.

A mounting bracket referred to in general by the reference numeral 30 is secured to each slotted portion of the extensions 20. Each bracket 30 includes a mounting plate 32 having corner apertures 34 formed therethrough and a pair of outstanding mounting ears 36 provided with aligned apertures 38. Each plate 32 is secured to the rear wall 28 of the corresponding extension 20 by means of bolt-type fasteners 40 secured through the corresponding slots 22 and 24 as well as the apertures 34 formed in the plate 32 with the ears 36 projecting rearwardly of the corresponding extension 20.

The suspension system which includes the brackets 30 is referred to in general by the reference numeral 42 and includes a pair of rearwardly and downwardly inclined generally Y-shaped support arms each referred to in general by the reference numeral 44. Each arm 44 includes a pair of divergent arm portions 46 and 48 whose free ends generally parallel each other and are provided with aligned transverse bores 50 in which resilient bushings 52 are received. Pivot fasteners 54 are secured through each pair of apertured mounting ears 36 and the corresponding bushings 52 whereby each support arm 44 is oscillatably supported from the corresponding extended end 20 of the transverse member 16 for angular displacement about an axis generally paralleling the transverse member 16 and extending between the free ends of the arms 46 and 48.

Each support arm 44 includes a base leg or stem 56 which forms a continuation of the base end of the corresponding arm 48 and curves laterally outwardly toward the corresponding side of the chassis 10 in the plane in which the corresponding arms 46 and 48 are contained. The free end of the leg or stem 56 of each support arm 44 includes an upstanding sleeve portion 58 by which the spindle portion 60 of a wheel assembly referred to in general by the reference numeral 62 is oscillatably supported through a conventional kingpin and bushing assembly referred to in general by the reference numeral 64 and the spindle portion journals a wheel whose lower periphery is centered in a vertical longitudinal plane passing centrally through the outboard mounting bracket 30.

The free end of the stem or leg 56 further includes a lower spring and shock absorber seat 66 against which the lower end of an inwardly and upwardly inclined coil spring 68 is seated and to which the lower end of an airplane type shock absorber 70 is secured in any convenient manner. Each of the longitudinal members 12 and 14 includes an upwardly and laterally outwardly projecting tower 72 against which the upper end of the corresponding spring 68 is abutted and to which the upper end of the associated shock absorber 70 is secured as at 74. Thus, it may be seen that each of the support arms 44 is oscillatably supported from the corresponding extended end 20 of the forward transverse member 16 for up and down swinging movement of the associated wheel assembly 62 in an arc extending about the axis of oscillation defined by the corresponding fasteners 54. Of course, the steerable wheel assemblies 62 are suitably interconnected by means of any well known type of steering controls (not shown) and the wheel assemblies 62 could be supported from the free ends of the leg or stem 56 of each support arm 44 by means of ball joints rather than a kingpin and bushing assembly. Also, it is possible that the opposite ends of a transverse axle member could be supported by the support arms 44 and also that the rearward ends of the support arm assemblies 44 could be downwardly biased by means of leaf springs in lieu of the coil springs 68.

The arms 46 and 48 as well as the leg or stem 56 of each support arm 44 may be tubular in construction, if desired. However, for heavy duty operations each of the support arm assemblies 44 will be of solid cross section. Further, the slots 22 and 24 enable relative adjustment of each pair of plates 32 and thus the geometry of the suspension assembly 42 to be adjusted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a vehicle of the type including a pair of transversely spaced and horizontally aligned chassis mounting points, a trailing arm suspension system including a generally Y-shaped support arm including (I) a pair of generally horizontal arms convergent and rigidly supported relative to each other at one pair of corresponding ends and defining free horizontally spaced apart ends at their opposite divergent ends and (II) an elongated generally horizontal stem projecting endwise rearwardly outwardly from and rigidly anchored to said convergent ends of said arms, rubber bushed mounting means pivotally attaching said free ends to said mounting points for swinging about aligned axes extending transversely of said chassis and between said mounting points and said free ends, and support wheel journalling means carried by the end of said stem remote from said arms and having a support wheel journalled therefrom for rotation about an axis generally paralleling the plane in which the arms are disposed, said aligned axes and said axis being disposed in a rearwardly and downwardly inclined transverse plane when said suspension system is in a static vehicle supporting condition, one of said chassis mounting points being disposed in an upstanding longitudinal plane containing the lowest peripheral portion of said wheel and the other of said chassis mounting points being spaced inboard of said one chassis mounting point.

2. The combination of claim 1 wherein said support wheel journalling means is supported from said stem for oscillation about an axis disposed generally normal to said plane.

3. The combination of claim 2 wherein the last-mentioned means includes a kingpin and bushing assembly.

4. In a vehicle of the type including a pair of transversely spaced and horizontally aligned chassis mounting points, a trailing arm suspension system including a generally Y-shaped support arm including (I) a pair of generally horizontal arms convergent and rigidly supported relative to each other at one pair of corresponding ends and defining free horizontally spaced ends at their opposite divergent ends and (II) an elongated generally horizontal stem projecting endwise outwardly from and rigidly anchored to said convergent ends of said arms, means pivotally attaching said free ends to said mounting points for swinging about aligned axes extending therebetween and between said free ends, and support wheel journalling means carried by the end of said stem remote from said arms for journalling a support wheel therefrom for rotation about an axis generally paralleling the plane in which the arms are disposed, said vehicle including opposite side longitudinal chassis members, said mounting points being spaced outwardly of one of said chassis members, the elongated stem curving laterally and outwardly away from said one chassis member at its free end, the laterally outwardly curving stem defining an outwardly opening recess between the free end of said stem and said adjacent ends of said arms adapted to provide turning clearance for a wheel journalled from said support wheel journalling means.

5. The combination of claim 4 wherein said support wheel journalling means is supported from said stem for oscillation about an axis disposed generally normal to said plane.

6. The combination of claim 1 wherein said mounting means are supported from said chassis for independent limited vertical shifting and slight angular displacement relative to said chassis about horizontal axes extending longitudinally of said chassis.

7. The combination of claim 6 wherein said chassis mounting points each includes a chassis mounted mounting plate a pair of horizontally spaced apart apertured mounting flanges, each arm free end having a transverse bore formed therethrough and resilient sleeve means received in said bore, said free ends of said arms being pivotally supported between said pairs of apertured mounting flanges by means of elongated pivot fasteners secured through each pair of apertured mounting flanges and the corresponding resilient sleeve means.

8. The combination of claim 1 wherein said vehicle chassis includes an elevated anchor point generally transversely aligned with the free end of said stem, and coil spring and strut-type shock absorber means secured between said anchor point and said free end of said stem.

9. In a vehicle of the type including a pair of transversely spaced and horizontally aligned chassis mounting points, a trailing arm suspension system including a generally Y-shaped support arm including (I) a pair of generally horizontal arms convergent and rigidly supported relative to each other at one pair of corresponding ends and defining free horizontally spaced ends at their opposite divergent ends and (II) an elongated generally horizontal stem projecting endwise outwardly from and rigidly anchored to said convergent ends of said arms, means pivotally attaching said free ends to said mounting points for swinging about aligned axes extending therebetween and between said free ends, and support wheel journalling means carried by the end of said stem remote from said arms for journalling a support wheel therefrom for rotation about an axis generally paralleling the plane in which the arms are disposed, said vehicle chassis including opposite side longitudinal members and a transverse member whose opposite ends project outwardly beyond the corresponding longitudinal members, said chassis mounting points being carried by the outwardly projecting ends of said transverse frame member.

10. The combination of claim 9 wherein said vehicle chassis includes an elevated anchor point generally transversely aligned with the free end of said stem, and coil spring and strut-type shock absorber means secured between said anchor point and said free end of said stem, said anchor point being supported from the adjacent longitudinal member of said chassis.

\* \* \* \* \*